(No Model.)

2 Sheets—Sheet 1.

A. B. KITTSON.
FOOT POWER MECHANISM.

No. 285,819. Patented Oct. 2, 1883.

WITNESSES
Benj. F. Badger.
James A. L. Whittier

INVENTOR.
Alfred B. Kittson (No Model.) 2 Sheets—Sheet 2.

A. B. KITTSON.
FOOT POWER MECHANISM.

No. 285,819. Patented Oct. 2, 1883.

WITNESSES
Benj. F. Badger.
James A. L. Whittier

INVENTOR
Alfred B. Kittson.

UNITED STATES PATENT OFFICE.

ALFRED B. KITTSON, OF BOSTON, MASSACHUSETTS.

FOOT-POWER MECHANISM.

SPECIFICATION forming part of Letters Patent No. 285,819, dated October 2, 1883.

Application filed January 27, 1883. (No model.)

*To all whom it may concern:*

Be it known that I, ALFRED B. KITTSON, a citizen of the United States, residing at Boston, in the county of Suffolk and State of Massachusetts, have made a new and useful Improvement in Foot-Power Mechanism, of which the following is a specification.

My improvement relates to that class of foot-power machines in which a smooth shaft is made to rotate by means of a roller-clutch operated by a treadle, the clutch being so contrived as to grasp the shaft and turn it in one direction, and when reversed to release the shaft and permit it to continue by its own momentum the motion thus acquired, while the clutch returns to its original position, the shaft being alternately grasped and released with each oscillation of the treadle.

In machines of this class the clutch has heretofore been operated by a belt passing around it and fastened at the ends to the arms of a yoke, or to the periphery of a wheel, to which an oscillating motion is given by a treadle. Such a belt is liable to stretch, occasioning a loss of power and a jerking irregular motion, as the reversal of the treadle is not at once communicated to the clutch.

My improvement consists in constructing the clutch-wheel with cogs on its outer circumference, and operating it by means of a segment-rack and lever connected with the treadle. By this means the motion of the treadle is at once transmitted to the clutch without loss of time or power, and the operation of the machine rendered smooth and regular.

My improvement is particularly adapted for use on sewing-machines; but may also be applied to other machines requiring little power and high speed.

Figures 1, 2:
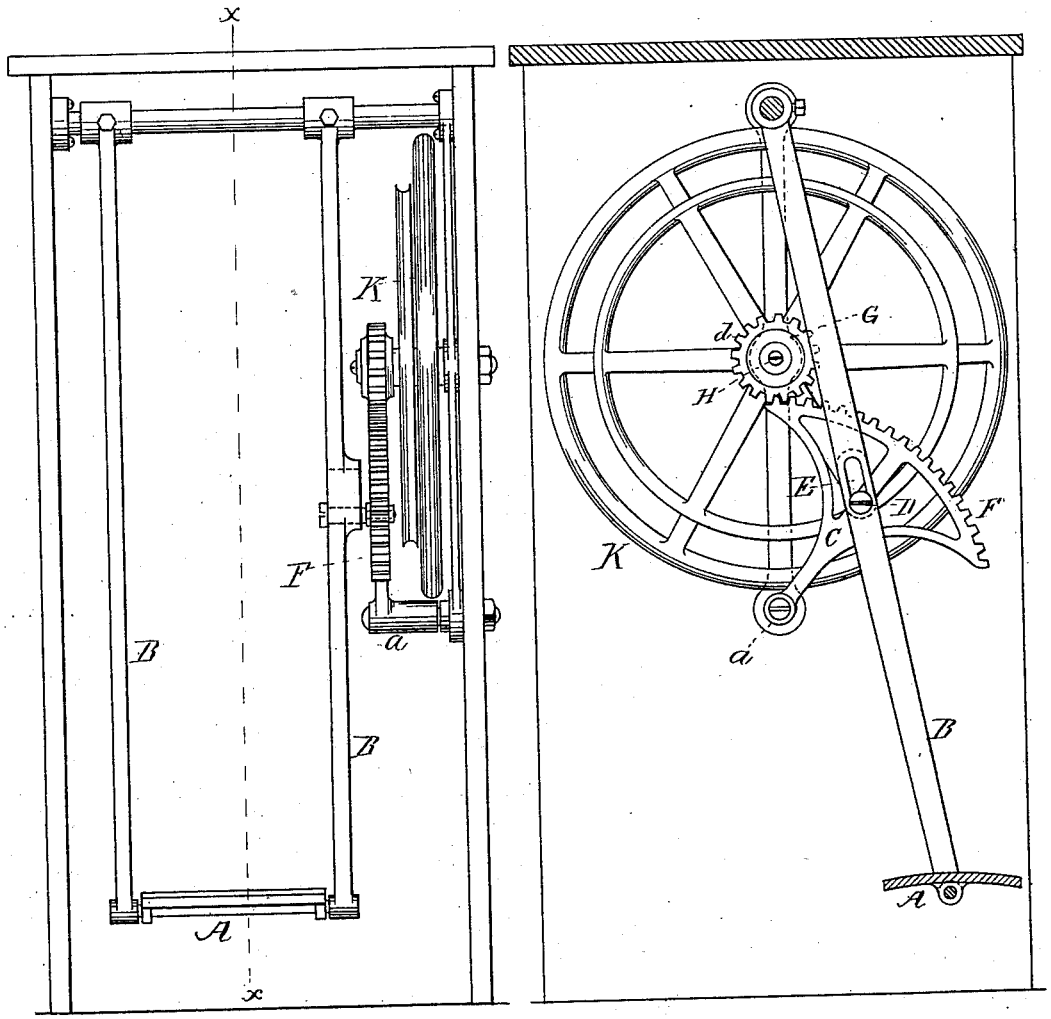
Figure 3:
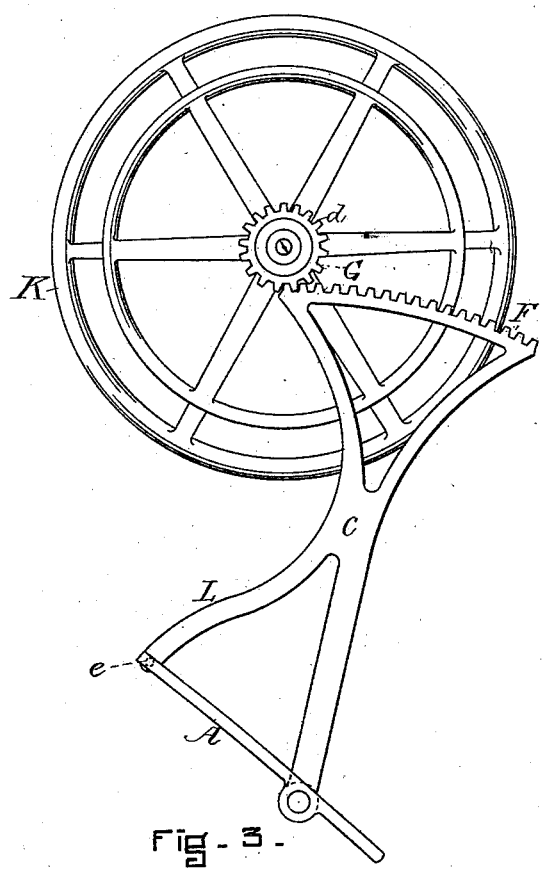
Figure 4:
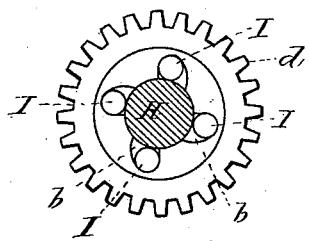

In the accompanying drawings, Figure 1 is a front vertical section of my improvement as used with a swinging treadle; Fig. 2, a side vertical section of the same; Fig. 3, a modification of my improvement adapting it for use with a rocking treadle. Fig. 4 is a section of the gear-clutch.

In Figs. 1 and 2, A is a swinging treadle, suspended by arms B from the machine-table, or from a supplemental frame constructed for that purpose. C is a lever pivoted at its lower extremity, by the stud *a* to the frame of the machine, and connected with one of the treadle-arms B by a stud, D, passing through the slot E. The upper end of the lever C is in the form of the segment of a circle having a radius equal to the length of the lever and furnished with cogs, forming the segment-rack F.

The gear-clutch G is bored centrally for the reception of the driving-shaft H, and is also furnished with longitudinal grooves *b*, extending from end to end of the hub and opening into the central aperture, said grooves being wider on one side than on the other, substantially as shown in the drawings, Fig. 4. In these grooves are placed rollers I, of such diameter as to jam against the inclined side of the grooves. Spiral springs may also be placed in the grooves to force the rollers toward the shaft. With this construction the gear-clutch will grasp the shaft firmly when turning in one direction, and will release it and permit it to turn freely when the motion is reversed. The circumference of the gear-clutch G is furnished with cogs *d*, corresponding with those on the segment-rack F. Attached to the driving-shaft H is the balance-wheel K. This is the form of my improved foot-power which I prefer, especially for sewing-machines, as the use of the swinging treadle permits an easy and healthy motion of the leg and foot. It may, however, be adapted for use with the common rocking treadle, as shown in Fig. 3, by lengthening the lever C and pivoting it at its lower end to the cross-bar on which the treadle turns, the lever C being connected near its middle point with the treadle by means of the arm L, pivoted to the treadle at *e*.

What I claim, and desire to secure by Letters Patent, is—

1. In combination with the shaft H, the clutch G, provided with friction-rollers I and cogs *d*, adapted to be operated by a reciprocating rack, substantially as described.

2. The clutch G, having friction-rollers I and cogs *d*, in combination with the shaft H, segmental rack F, and lever C, substantially as set forth.

3. The clutch G, having friction-rollers I and cogs *d*, in combination with the shaft H, reciprocating segmental rack F, slotted lever B, and swinging treadle A, constructed to operate as and for the purpose specified.

ALFRED B. KITTSON.

Witnesses:
BENJ. F. BADGER,
JAMES A. L. WHITTIER.